United States Patent [19]

Henzi

[11] Patent Number: 4,687,842
[45] Date of Patent: Aug. 18, 1987

[54] MONOAZO COMPOUNDS HAVING AN IMIDAZOLIUM-2 GROUP LINKED THROUGH AN AZO RADICAL TO A SUBSTITUTED PHENYL GROUP

[75] Inventor: Beat Henzi, Allschwil, Switzerland

[73] Assignee: Sandoz Ltd., Basel, Switzerland

[21] Appl. No.: 111,794

[22] Filed: Jan. 14, 1980

[30] Foreign Application Priority Data

May 17, 1977 [CH] Switzerland .................. 6133/77
Mar. 29, 1978 [CH] Switzerland .................. 3344/78

[51] Int. Cl.[4] .................... C09B 29/036; C09B 44/16; D06P 1/08; D06P 1/41
[52] U.S. Cl. .................................. 534/607; 534/573; 534/589; 534/599; 534/611; 534/753; 534/765; 534/768; 534/794
[58] Field of Search ............... 260/146 R, 146 D, 147, 260/154, 155, 156, 157; 534/607, 611

[56] References Cited

U.S. PATENT DOCUMENTS

| | | | |
|---|---|---|---|
| 3,102,879 | 9/1963 | Baumann et al. | 260/157 |
| 3,173,907 | 3/1965 | Klingsberg et al. | 534/607 |
| 3,649,162 | 3/1972 | James | 260/154 |
| 3,763,140 | 10/1973 | Entschel et al. | 260/157 X |
| 4,028,321 | 6/1977 | Fleckenstein et al. | 260/157 X |
| 4,082,740 | 4/1978 | Mohr et al. | 260/157 X |
| 4,251,440 | 2/1981 | Kaeppeli | 534/607 |
| 4,294,756 | 10/1981 | Kualthau | 534/607 |

FOREIGN PATENT DOCUMENTS

| | | |
|---|---|---|
| 2142565 | 3/1973 | Fed. Rep. of Germany ...... 260/157 |
| 2518345 | 11/1975 | Fed. Rep. of Germany ...... 260/157 |
| 2548009 | 5/1976 | Fed. Rep. of Germany ...... 260/157 |
| 2603160 | 8/1976 | Fed. Rep. of Germany ...... 260/157 |
| 1214394 | 12/1970 | United Kingdom ................ 260/156 |
| 1,303,498 | 1/1973 | United Kingdom ................ 260/157 |

Primary Examiner—Floyd D. Higel

Attorney, Agent, or Firm—Gerald D. Sharkin; Richard E. Vila; Melvyn M. Kassenoff

[57] ABSTRACT

Compounds of the formula

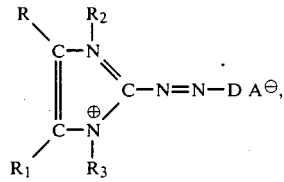

wherein
each of R and $R_1$ is independently hydrogen, $C_{1-4}$alkyl, phenyl or phenyl substituted by 1 to 3 $C_{1-4}$alkyl, $C_{1-4}$alkoxy or halo substitutents or
R and $R_1$ taken together are trimethylene or tetramethylene,
each of $R_2$ and $R_3$ is independently allyl, $C_{1-4}$alkyl, phenyl ($C_{1-4}$alkyl) or $C_{2-4}$alkyl monosubstituted by hydroxy, cyano or carbamoyl,

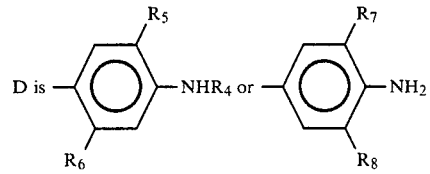

wherein
$R_5$, $R_6$, $R_7$ and $R_8$ are as defined in the specification, and $A^\ominus$ is an anion, and mixtures thereof with cationic 5-hydroxypyrazole dyes, are useful for dyeing and printing materials dyeable with basic dyes, e.g., homopolymers and copolymers of acrylonitrile and asymmetrical dicyanoethylene, polyamides and polyesters modified to contain acidic groups, leather and paper.

19 Claims, No Drawings

MONOAZO COMPOUNDS HAVING AN IMIDAZOLIUM-2 GROUP LINKED THROUGH AN AZO RADICAL TO A SUBSTITUTED PHENYL GROUP

This application is a continuation of application Ser. No. 904,998, filed May 11, 1978 and now abandoned.

This invention relates to basic azo compounds free from sulphonic acid groups.

More particularly, the invention provides basic azo compounds of formula I

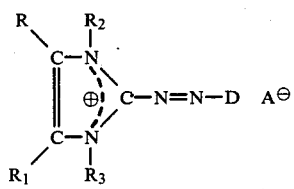

in which

R and $R_1$ are independently hydrogen; $C_{1-4}$alkyl phenyl optionally substituted by 1 to 3 $C_{1-4}$alkyl or $C_{1-4}$alkoxy groups or halogen atoms; or together form a trimethylene or tetramethylene bridge, $R_2$ and $R_3$ are independently allyl; $C_{1-4}$alkyl optionally substituted by a phenyl group; or $C_{2-4}$alkyl substituted by one —OH, —CN or —$CONH_2$ group, $A^\ominus$ is an anion, and D is a group of formula IIA or IIB

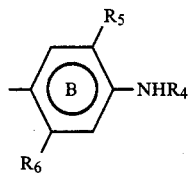

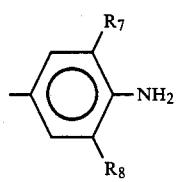

in which $R_4$ is hydrogen; cyclohexyl; $C_{1-18}$alkyl; $C_{2-4}$alkyl substituted by one hydroxy, cyano halogen, $C_{1-4}$alkoxy,

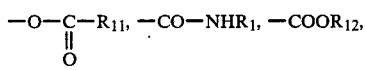

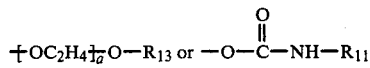

group; phenyl optionally substituted by one $C_{1-4}$alkyl or $C_{2-4}$alkenyl group; $C_{1-4}$alkenyl; or a group of the formula

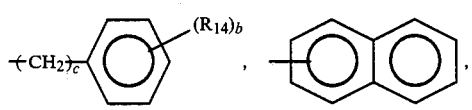

-continued $+CH_2\}_cO-R_{15}, -O-R_1$ or $-N(R_1)_2$, in which a is 1 or 2, b is 0, 1 or 2, c is 1, 2, 3 or 4, $R_{11}$ is phenyl optionally substituted by one halogen atom or $C_{1-4}$alkyl group, $R_{12}$ is unsubstituted $C_{1-4}$alkyl or phenyl optionally substituted by one halogen atom or $C_{1-4}$alkyl group, $R_{13}$ is hydrogen or $C_{1-4}$alkyl, $R_{14}$ is chlorine or $C_{1-4}$alkyl, and $R_{15}$ is α- or β-naphthyl or a group of the formula

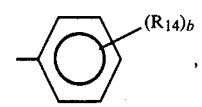

$R_5$ is halogen, $C_{1-4}$alkyl, $C_{1-4}$alkoxy, cyano, trifluoromethyl, nitro $-CO-R_{12}, -COOR_{12}$ or $-SO_2+X\}_nR_{12}$, where X is —O— or —$NR_{13}$— and n is 0 or 1, or $R_4$ and $R_5$ together with the nitrogen atom to which $R_4$ is attached and ring B constitute a group of the formula

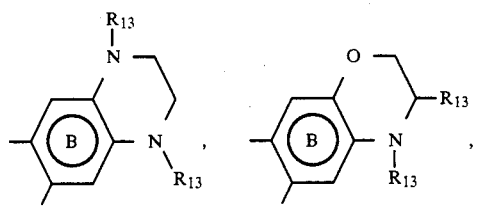

(a)                                  (b)

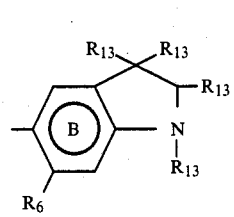   or   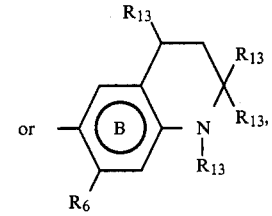

(c)                                  (d)

$R_6$ is hydrogen, halogen; $C_{1-4}$alkyl; $C_{1-4}$alkoxy or a group of formula —$N(R_1)_2$, provided that $R_6$ may b —$N(R_1)_2$ only when $R_5$ is halogen alkyl or alkoxy; with the further proviso that when $R_4$ is hydrogen and $R_5$ is methoxy, then $R_6$ is other than hydrogen or methoxy, and $R_7$ and $R_8$ are independently halogen, $C_{1-4}$alkyl or $C_{1-4}$alkoxy, provided that $R_7$ and $R_8$ are not both chlorine.

R and $R_1$ are preferably $R_a$ and $R_{1a}$, where $R_a$ and $R_{1a}$ are independently hydrogen or $C_{1-4}$alkyl more preferably $R_b$ and $R_{1b}$, where $R_b$ and $R_{1b}$ are independently hydrogen or methyl, particularly hydrogen.

$R_2$ and $R_3$ are preferably $R_{2a}$ and $R_{3a}$, where $R_{2a}$ and $R_{3a}$ are independently unsubstituted $C_{1-4}$alkyl or $C_2$-

4alkyl substituted by one hydroxyl group; more preferably $R_{2b}$ and $R_{3b}$ where $R_{2b}$ and $R_{3b}$ are independently methyl, ethyl, —CH$_2$—CH$_2$OH or —CH$_2$—CH(CH$_3$)—OH, particularly methyl.

$R_4$ is preferably $R_{4a}$ where $R_{4a}$ is hydrogen; cyclohexyl; $C_{1-8}$alkyl; $C_{2-4}$alkyl substituted by one —OH, —CN, $C_{1-4}$alkoxy or

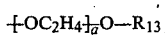

group; or a

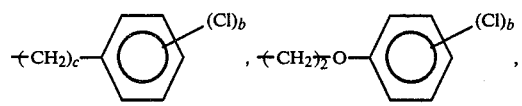

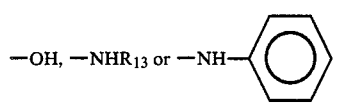

group. More preferably, $R_4$ is $R_{4b}$ where $R_{4b}$ is hydrogen, methyl, ethyl, propyl, n-butyl, —CH$_2$CH$_2$OH, —CH$_2$CH(OH)CH$_3$, —(CH$_2$)$_3$OH, —(CH$_2$)$_3$—OCH$_3$, —CH$_2$CH$_2$CN benzyl,

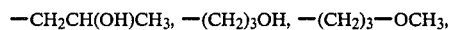

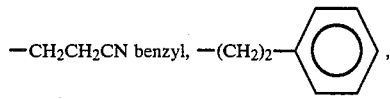

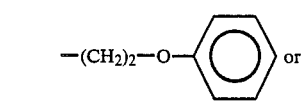

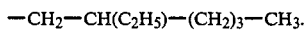

Particularly preferred significances of $R_4$ are $R_{4c}$, that is hydrogen, methyl, ethyl, propyl, n-butyl, —CH$_2$CH$_2$OH, —CH$_2$CHOH—CH$_3$, —(CH$_2$)$_3$—OH, —(CH$_2$)$_3$—OCH$_3$ and —CH$_2$—CH(C$_2$H$_5$)—(CH$_2$)$_3$—CH$_3$. Of particular importance are the significances $R_{4d}$, that is, hydrogen, methyl, ethyl and —CH$_2$CH$_2$OH.

$R_5$ is preferably $R_{5a}$ where $R_{5a}$ is chlorine, fluorine, $C_{1-4}$alkyl, $C_{1-4}$alkoxy, trifluoromethyl, nitro or —CO—[O]$_m$—R$_{12a}$, wherein m is 0 or 1, $R_{12a}$ is $C_{1-4}$alkyl, or $R_{4a}$ and $R_{5a}$ together with the nitrogen atom to which $R_{4a}$ is attached and ring B constitute a group of formula (b), (c) or (d) above, in which $R_{6a}$ takes the place of $R_6$. More preferably, $R_5$ is $R_{5b}$ where $R_{5b}$ is chlorine, fluorine, methoxy, ethoxy, cyano, trifluoromethyl, —COOCH$_3$ or —COOC$_2$H$_5$, or $R_{4b}$ and $R_{5b}$ together with the nitrogen atom to which $R_{4b}$ is attached and ring B constitute a group of the formula

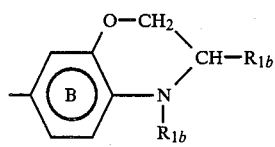

where $R_{1b}$ is as defined above. Most preferably, $R_5$ is chlorine.

$R_6$ is preferably $R_{6a}$, where $R_{6a}$ is hydrogen, chlorine, fluorine, $C_{1-4}$)alkyl, $C_{1-4}$alkoxy or additionally, but only when $R_5$ is halogen, alkyl or alkoxy, an —NH$_2$ group. More preferably, $R_6$ is $R_{6b}$ where $R_{6b}$ is hydrogen, chlorine or methyl, and most preferably, $R_6$ is $R_{6c}$ where $R_{6c}$ is hydrogen or chlorine, particularly hydrogen. When $R_4$ is hydrogen and $R_5$ is methoxy, $R_{6a}$ is other than hydrogen or methoxy and $R_{6b}$ and $R_{6c}$ are other than hydrogen.

$R_{12}$ is preferably $R_{12a}$ where $R_{12a}$ is as defined above. $R_{13}$ is preferably methyl, and $R_{14}$ is preferably chlorine.

When R and $R_1$ are alkyl, they are preferably methyl. When $R_2$ or $R_3$ are unsubstituted alkyl, they are preferably methyl or ethyl, particularly methyl. When $R_2$ or $R_3$ are hydroxy-substituted alkyl, they are preferably —CH$_2$CH$_2$OH or —CH$_2$—CH(CH$_3$)—OH.

When $R_4$ is unsubstituted alkyl, it is preferably a $C_{1-8}$alkyl group, more preferably methyl, ethyl, propyl, n-butyl or —CH$_2$CH(C$_2$H$_5$)—(CH$_2$)$_3$—CH$_3$, particularly methyl or ethyl. When it is a hydroxy-substituted $C_{2-4}$alkyl group, it is preferably —CH$_2$CH$_2$OH, —(CH$_2$)$_3$OH or —CH$_2$CHOHCH$_3$, particularly —CH$_2$CH$_2$OH. When it is an alkoxy-substituted $C_{2-4}$alkyl group, it is preferably —(CH$_2$)$_3$—OCH$_3$, and when it is a cyano-substituted $C_{2-4}$alkyl group it is preferably —CH$_2$CH$_2$CN. When $R_4$ is a group of the formula

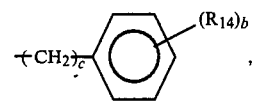

then preferably c is 1 or 2 and b is 0, or c is 1, b is 1 or 2 and $R_{14}$ is chlorine. When $R_4$ is a group of the formula —(CH$_2$)$_2$—O—R$_{15}$, then preferably $R_{15}$ is phenyl. When $R_4$ is a group of the formula —N(R$_1$)$_2$, then it is preferably

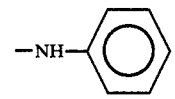

or —NHR$_{13}$, where $R_{13}$ is preferably $C_{1-4}$alkyl.

When $R_5$ is alkoxy, it is preferably methoxy or ethoxy, and when $R_5$ is a carboxylic acid ester group, it is preferably —COOCH$_3$ or —COOC$_2$H$_5$.

When $R_6$ is alkyl it is preferably methyl. When $R_{12}$ is alkyl, it is preferably methyl or ethyl. Any halogen is preferably fluorine or chlorine, more preferably chlorine. Any substituted alkyl group attached to a nitrogen atom is preferably substituted other than in the alpha position except when the substituent is phenyl or substituted phenyl.

A representative class of compounds of formula I are the compounds of formula Ia

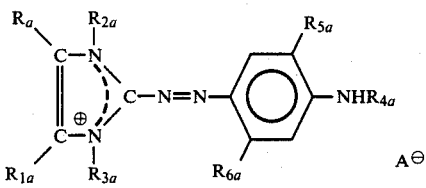

in which $R_a$, $R_{1a}$, $R_{2a}$, $R_{3a}$, $R_{4a}$, $R_{5a}$, $R_{6a}$ and $A^\ominus$ are as defined above, with the proviso that when $R_{4a}$ is hydrogen and $R_{5a}$ is methoxy, then $R_{6a}$ is other than hydrogen or methoxy.

A preferred group of compounds of formula Ia are the compounds of formula Ib

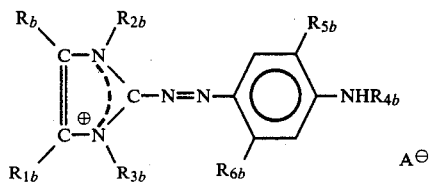

in which $R_b$, $R_{1b}$, $R_{2b}$, $R_{3b}$, $R_{4b}$, $R_{5b}$, $R_{6b}$ and $A^\ominus$ as as defined above, with the proviso that when $R_{4b}$ is hydrogen and $R_{5b}$ is methoxy, then $R_{6b}$ is other than hydrogen.

Representative groups of compounds of formula Ib are (1) those wherein —$NHR_{4b}$, $R_{5b}$ and $R_{6b}$ taken together and with the ring to which they are attached form a group of formula (b″) and (2) those wherein they do not form a group of formula (b″).

More preferred compounds are those of formula Ic

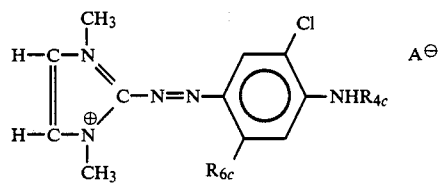

in which $R_{4c}$, $R_{6c}$ and $A^\ominus$ are as defined above, and particularly preferred compounds are those of formula Id

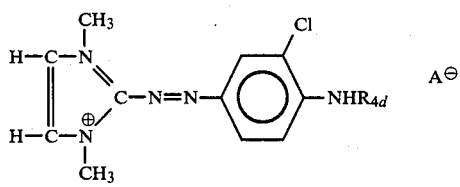

in which $R_{4d}$ and $A^\ominus$ are as defined above.

Preferred compounds of formula Id are those wherein $R_{4d}$ is hydrogen.

The nature of the anion $A^\ominus$ is not critical, and any anions commonly used in the basic azo dyestuff art may be employed, preferably those anions which are not chromophoric. Suitable anions include organic and inorganic anions, for example chloride, bromide, sulphate, bisulphate, methyl sulphate, aminosulphonate, oxalate, maleate, acetate, propionate, lactate, succinate, tartrate, malate, methanesulfonate and benzoate ions, complex anions, such as those of zinc chloride double salts as well as the anions of the following acids: boric acid, citric acid, glycolic acid, diglycolic acid, adipic acid, and addition products of orthoboric acid with polyalcohols such as cis-polyols.

The invention also provides a process for the preparation of compounds of formula I characterised by either (a) treating a compound of formula III

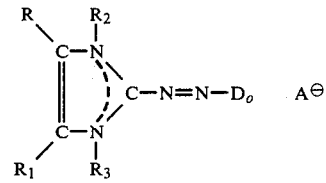

in which

R, $R_1$, $R_2$, $R_3$ and $A^\ominus$ are as defined above and $D_o$ is a group of formula IV or V

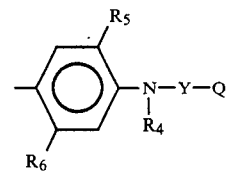

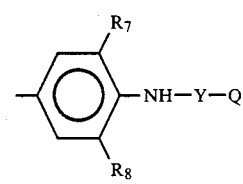

in which

Y is —CO— or —$SO_2$— and

Q is $C_{1-4}$alkyl with an acid HA in which A is a group capable of forming the anion $A^{63}$, or (b) preparing a compound of formula I, stated above, in which D is a group of formula IIA, by reacting a compound of formula IV,

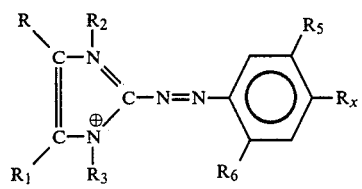

in which $R_x$ is an anionic leaving group, for example halogen, alkoxy or (when $R_5$ is halogen, alkyl or alkoxy) an a nitro group, with a compound of formula VII $R_4$—$NH_2$     VII The compounds of formula III and the corresponding unquaternised compounds are novel. These compounds may be prepared by coupling a diazo compound derived from an amine of formula VIII $D_o$—$NH_2$     VIII with a coupling component of formula IX or IXA

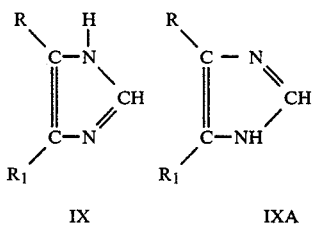

to form a compound of formula X or XA

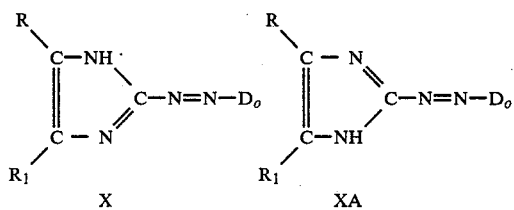

It will be appreciated that when $R=R_1$, then formula IX and IXA as well as X and XA are identical. The compound X (or XA) is then alkylated with a compound of formula $R_2$—A where A is a group giving rise to the anion $A^\ominus$, and finally quaternised with a compound of formula $R_3$—A to give the compound of formulae III. If desired, the alkylation may be carried out with $R_3$—A and the quaternisation with the $R_2$—A.

The compounds of formula VI, as well as their corresponding non-quaternised compounds, are also novel. They may be prepared by coupling a diazo compound derived from an amine of formula XI

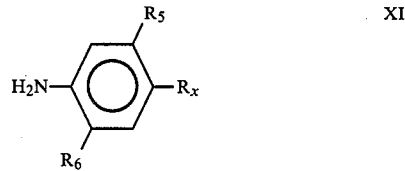

with a coupling component of formula IX or IXA above, to give a compound of formula XII

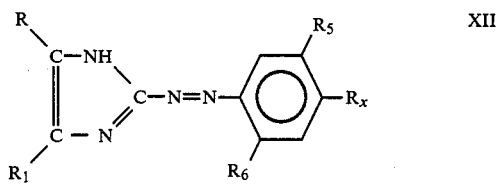

or the corresponding compound with the hydrogen on the other ring nitrogen, which is then alkylated and quaternised as described above.

The compounds of formulae VII, VIII, IX and XI are known or may be prepared from known compounds by conventional methods.

The cleavage of the group —Y—Q from compounds of formula III is suitably carried out in aqueous solution in the presence of a strong mineral acid, for example hydrochloric acid, or in a mixture of an organic acid, for example acetic acid, and a mineral acid at a temperature of from 50°–100° C., preferably from 60°–80° C.

The diazotization, coupling, alkylation and quaternisation steps, as well as the reaction of compound VI with the amine VII, are all conventional and may be carried out in known manner.

In the compounds of formula I, the anion $A^\ominus$ may be exchanged for other anions, e.g. by an ion exchange resin or by reaction with salts or acids, optionally in several stages, e.g. through the hydroxide or the bicarbonate, or in accordance with French Patent Specification No. 2,028,725 or 2,028,726.

The compounds of formula I are useful for the dyeing and printing of substrates dyeable with basic dyes.

The compounds of formula I are conveniently incorporated into dyeing preparations. The processing, e.g. into stable, liquid or solid dyeing preparations, may take place in generally known manner, e.g. by grinding or granulating, or by dissolving in suitable solvents, optionally adding an auxilliary, e.g. a stabilizer or dissolving intermediary, such as urea. Such preparations may be obtained for example as described in French Patent Specifications Nos. 1,572,030 and 1,581,900 or in accordance with German DOS Nos. 2,001,748 and 2,001,816.

The compounds may be employed for dyeing or printing a wide variety of substrate forms, e.g. fibres, threads, or textiles produced therefrom, which consist of or contain homo or mixed polymers of acrylonitrile or of asymmetrical dicyanoethylene.

Acid modified synthetic polyamides and polyesters may also be dyed or printed. Such polyamides are known, for example from U.S. Pat. Nos. 3,039,990 and 3,454,351. Corresponding polyesters are known from U.S. Pat. No. 2,893,816 and Belgian Pat. No. 549,179.

The new compounds are also suitable for dyeing leather and paper as well as for continuous gel dyeing, for which a liquid dyeing composition is particularly suitable. The continuous gel dyeing process is described for example in *Textilveredlung* 10, 63 (1975).

Dyeing and printing using the dyestuffs of formula I may be carried out by standard methods normally used for cationic dyes, for example by dyeing from an aqueous neutral or acidic medium at temperatures from 60° C. to boiling point, or higher temperatures under pressure, and also by dyeing in organic solvents, e.g. as described in German DOS No. 2,437,549.

The dyestuffs exhibit good build-up power and give deep, brilliant dyeings having good fastnesses, for example fastness to light, ironing, heat, steam, washing, sweat, pleating, decatizing, dry cleaning and cross-dyeing. The dyestuffs reserve wool, have notable pH-stability, combination properties, migration, stability to boiling, resistance to hydrolysis, good solubility and high saturation limits and are scarcely affected by electrolytes.

Level dyeings of the above-mentioned materials may be obtained by the use of a mixture of a compound of formula I and a compound of formula XIII

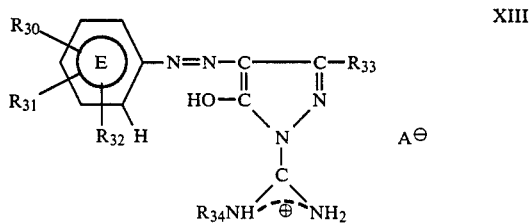

in which $R_{30}$ is hydrogen, halogen, unsubstituted or halogensubstituted $C_{1-4}$alkyl or unsubstituted $C_{1-4}$alkoxy, $R_{31}$ is hydrogen, $C_{1-4}$alkyl or $C_{1-4}$alkoxy, or together with $R_{30}$ and ring E forms an indane, tetralin, 1,3- or 1,4-benzodioxane or benzodioxole ring, $R_{32}$, $R_{33}$ and $R_{34}$ are independently hydrogen or $C_{1-4}$alkyl, and $A^{\ominus}$ is an anion, the molecular weight of the cationic groups of the compound of formula I and the compound of formula XIII being in each case less than 310.

$R_{30}$ is preferably $R_{30a}$ where $R_{30a}$ is hydrogen, methyl, ethyl, fluorine, chlorine, trifluoromethyl, methoxy or ethoxy, more preferably methyl.

$R_{31}$ is preferably $R_{31a}$ where $R_{31a}$ is hydrogen, methyl or methoxy, more preferably $R_{31b}$ where $R_{31b}$ is hydrogen or methyl.

$R_{32}$, $R_{33}$ and $R_{34}$ are preferably $R_{32a}$, $R_{33a}$ and $R_{34a}$, which are independently hydrogen or methyl; particularly $R_{32}$ is hydrogen, $R_{33}$ is methyl and $R_{34}$ is hydrogen.

When $R_{30}$ is alkyl it is preferably methyl or ethyl, more preferably methyl. When $R_{30}$ is halogen it is preferably fluorine or chlorine. When $R_{30}$ is alkoxy it is preferably methoxy or ethoxy, and when it is a substituted alkyl it is preferably trifluoromethyl. When $R_{31}$ is alkoxy it is preferably methoxy. When $R_{31}$, $R_{32}$, $R_{33}$ and $R_{34}$ are alkyl, they are preferably methyl.

Preferred mixtures are those of a compound of formula Ia with a compound of formula XIII a

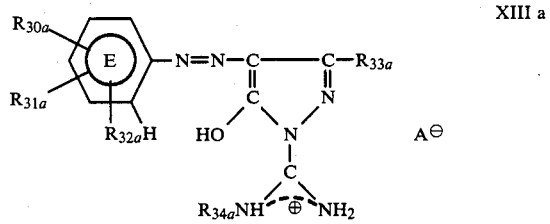

XIII a in which $R_{30a}$, $R_{31a}$, $R_{32a}$, $R_{33a}$, $R_{34a}$ and $A^{\ominus}$ are as defined above, and in which the molecular weight of the cationic group of each component is less than 295. Particularly preferred mixtures are those of a compound of formula Ib, or particularly of formula Ic or Id, with a compound of formula XIIIb

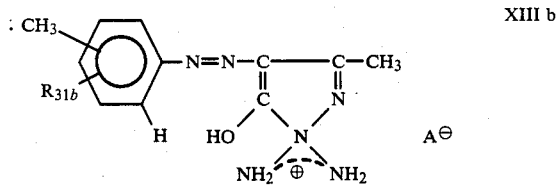

XIII b in which $R_{31b}$ and $A^{\ominus}$ are as defined above, and in which the molecular weight of the cationic group of each component is less than 285.

In such mixtures, the composition is suitably 5–95% by wt., preferably 30–70% by wt., of compound of formula I and 95–5% by wt., preferably 70–30% by wt., of compound of formula XIII. The mixture may be used alone or together with other basic dyestuffs having a molecular weight of the cationic group less than 310.

The compounds of formula XIII are known and may be prepared as described in German DOS No. 1,044,310.

The mixtures may be incorporated into dyeing preparations in the same way as for the individual components and are suitable for use in the dyeing of polyacrylonitrile and polyester materials. In particular, polyacrylonitrile materials having different build-up rates can be dyed by the same simple process.

Polyacrylonitriles with slow, normal or fast build-up rates which are suitable for dyeing such mixtures are described for example in German DOS No. 2,548,009. Synthetic polyesters are described for example in U.S. Pat. No. 3,018,272.

The dyes of formula I and XIII migrate readily. They may advantageously be applied without a retarder; however, if a retarder is used it is preferable that the retarder should also migrate readily. Such retarders are known.

Dyeing may suitably be carried out in an acidic aqueous bath at a pH of from 4 to 6, preferably 4.5 to 5, at a liquor ratio of from 1:5 to 1:80, preferably from 1:5 to 1:40, suitably in the presence of an electrolyte in an amount of from 1–20%, preferably 1–15%, more preferably 5–15%, calculated on the weight of the goods. The dyeing temperature may be up to the boiling point or, under pressure, up to 105°.

Dyeing may be carried out in the presence of conventional aids, for example condensation products of naphthalenesulphonic acids and formaldehyde, or reaction products of castor oil and ethylene oxide.

The dyeings obtained by the use of mixtures of compounds of formulae I and XIII have excellent fastness properties, for example light and sweat fastness. The dyes migrate readily. In particular, the mixtures show improved phototropic properties as compared with the individual components.

In the following Examples, parts and percentages are by weight, and temperatures are in degrees centigrade. It will be appreciated that many of the compounds mentioned in the Examples may exist in more than one tautomeric form, although where structural formulae are given, only one form will be shown.

EXAMPLE 1 37 Parts of 3-chloro-4-acetylaminoaniline are diazotised in 350 parts of water and 50 parts of 30% hydrochloric acid at 0°–5°, with 45 parts of sodium nitrite solution. After breaking down the excess nitrous acid with 1.5 parts of aminosulphonic acid, the clear diazonium salt solution is added dropwise to a cold solution consisting of 13.6 parts of imidazole in 100 parts of dimethylformamide and 1.5 parts of pyridine. During coupling, the pH is kept between 8 and 9 by continually adding 30% sodium hydroxide solution. After dilution with 250 parts of ice water, the suspension is stirred for 4 hours and the precipitated dyestuff is filtered off.

The filter cake is washed with 200 parts of water and dried in a vacuum at 50°. 27.5 parts of the dried, ground dyestuff of the formula

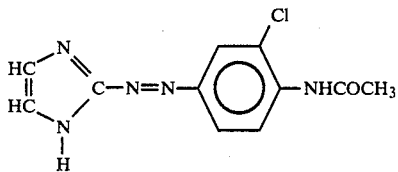

are suspended in 150 parts of dimethylformamide whilst adding 4.3 parts of magnesium oxide, and the suspension is heated to 50°–60°, whereby the dyestuff goes partly into solution. 50.5 Parts of dimethyl sulphate are added dropwise in the course of 60 minutes at this temperature range, whereby after stirring for three hours, a thin-layer chromatographic check shows that there is no longer any starting material present. After adding 360 parts of approximately 26% brine, the dyestuff suspension is stirred until cold, suctioned off and washed with 100 parts of 15% sodium chloride solution.

The moist presscake is subsequently stirred into 120 parts of glacial acetic acid and 30 parts of 30% hydrochloric acid and heated for 4 hours to 75°. A dark yellow solution is obtained. The cold-stirred solution is diluted with 300 parts of water, brought to a pH of 5 with 30% sodium chloride solution and salted out with 28 parts of zinc chloride. After filtering the dyestuff which has precipitated in crystals, it is washed with 150 parts of 15% sodium chloride solution and vacuum dried at 50°–60°.

A dyestuff of the formula

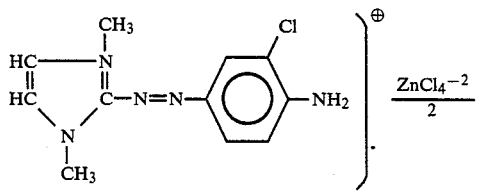

is obtained, which dyes polyacrylonitrile and anionically-modified polyester fibres in fast orange shades and has good migration on polyacrylonitrile.

EXAMPLE 2

24 Parts of the dyestuff of the formula

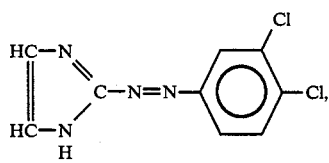

obtained by coupling diazotised 3,4-dichloroaniline with imidazole in aqueous solution at pH 8–9, are dissolved in 120 parts dimethylformamide and 3 parts magnesium oxide are added. 60 Parts of dimethyl sulphate are added dropwise at 25°, the mixture is stirred for 20 hours and the precipitated dyestuff is filtered off. The moist filter cake is stirred in 200 parts carbon tetrachloride, filtered and dried in a vacuum oven at 40°.

13.5 Parts of the dried dyestuff of the formula

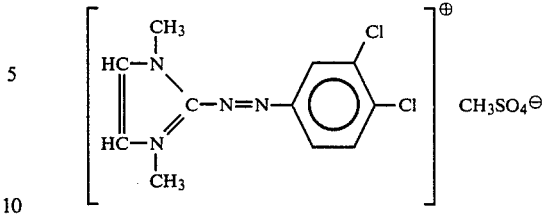

are dissolved in 100 parts cellosolve ® and treated with aqueous ammonia at 40°–45°. After stirring for 4–5 hours, a thin layer chromatograph shows that practically no starting material is present. By addition of dilute hydrochloric acid the solution is brought to a pH of approximately 5, 90 parts of 21% brine are added and the solution is stirred overnight. The precipitated dyestuff is filtered off, and the filter cake, which still contains large quantities of sodium chloride, is stirred with 110 parts of fresh 10% brine. After filtration and washing with 100 parts of 10% brine, the dyestuff is dried in vacuo at 50°. The same dyestuff as that of Example 1 is obtained.

EXAMPLE 3

44 Parts of 2,5-dichloro-4-acetylaminoaniline are diazotised in 1000 parts of water and 20 parts of 30% hydrochloric acid at 0°–5°, with 14 parts of sodium nitrite in the form of a 4N solution. After breaking down the excess nitrous acid with 1.5 parts of aminosulphonic acid, the clear-filtered diazonium salt solution is added dropwise to a cold solution consisting of 13.6 parts of imidazole in 150 parts of water. During coupling, the pH is kept at between 8 and 9 by continuously adding 30% sodium hydroxide solution, and the temperature is kept at between 0° and 50°. After diluting with 600 parts of ice water, the suspension is stirred for 4 hours and the precipitated dyestuff is filtered off.

The filter cake is washed with 200 parts of water and vacuum dried at 50°. 32.7 Parts of the dried, ground dyestuff of the formula

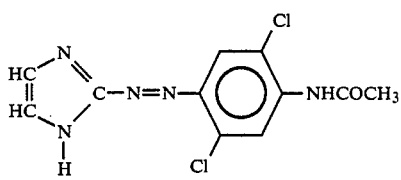

are suspended in 250 parts of dimethylformamide, whilst adding 4.3 parts of magnesium oxide, and the suspension is heated to 40°–45°, whereby the dyestuff goes partly into solution. 75 Parts of dimethyl sulphate are added dropwise at this temperature range, over the course of 60 minutes, and after stirring for three hours, thin-layer chromatography shows that there is no longer any initial product present. After adding 250 parts of approximately 26% brine, the dyestuff suspension is stirred at room temperature, suctioned off and washed with 100 parts of 20% sodium chloride solution.

The moist presscake is subsequently stirred into 200 parts of water and 50 parts of 30% hydrochloric acid, and heated for 4 hours to 60°–65°. A dark-yellow suspension is obtained. The cold-stirred suspension is diluted with 300 parts of 13% brine.

After filtering the dyestuff which precipitates in crystals, it is washed with 250 parts of 2.5% sodium chloride solution and dried at 50°–60° in a vacuum.

A dyestuff of the formula

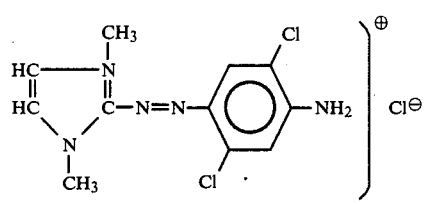

is obtained which dyes polyacrylonitrile and anionically-modified polyester fibres in fast yellowish-orange shades and has good migration on polyacrylonitrile.

EXAMPLES 4–35

Table I gives the structures of further dyestuffs of formula I, which may be prepared by the methods given in Examples 1–3. They correspond to the formula

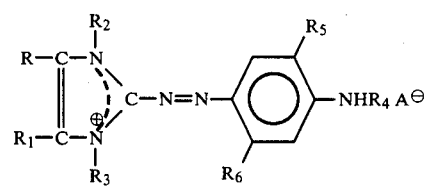

in which R and $R_1$–$R_6$ are as shown in the corresponding columns. The anion $A^{\ominus}$ may be any anion described above.

TABLE I

| Ex. No. | R | $R_1$ | $R_2$ | $R_3$ | $R_4$ | $R_5$ | $R_6$ |
|---|---|---|---|---|---|---|---|
| 4 | H | H | —$CH_3$ | —$CH_3$ | H | F | H |
| 5 | H | H | " | " | —$CH_3$ | F | H |
| 6 | H | H | " | " | " | Cl | H |
| 7 | H | H | " | " | —$C_2H_5$ | " | H |
| 8 | H | H | " | " | —$C_2H_4OH$ | " | H |
| 9 | H | H | " | " | H | —$CH_3$ | H |
| 10 | H | H | " | " | —$C_2H_5$ | F | H |
| 11 | H | H | —$C_2H_5$ | —$C_2H_5$ | H | Cl | H |
| 12 | H | H | " | " | H | F | H |
| 13 | —$CH_3$ | H | $CH_3$ | —$CH_3$ | H | Cl | H |
| 14 | H | —$CH_3$ | " | " | H | " | H |
| 15 | —$CH_3$ | " | " | " | H | " | H |
| 16 | —$(CH_2)_3$— | | " | " | H | " | H |
| 17 | H | H | —$CH_3$ | —$CH_3$ | —$CH_3$ | Cl | Cl |
| 18 | H | H | —$C_2H_5$ | —$C_2H_5$ | H | Cl | Cl |
| 19 | H | H | —$CH_3$ | —$CH_3$ | H | —$OCH_3$ | —$CH_3$ |
| 20 | H | H | " | " | H | Cl | —$NH_2$ |
| 21 | H | H | " | " | —$CH_2$—C$_6$H$_5$ | Cl | H |
| 22 | H | H | " | " | n-$C_4H_9$ | " | H |
| 23 | H | H | " | " | —$C_8H_{17}$ | " | H |
| 24 | H | H | " | " | —cyclohexyl | " | H |
| 25 | H | H | " | " | —$C_2H_4CN$ | " | H |
| 26 | H | H | " | " | —$(CH_2)_3$—$OCH_3$ | " | H |
| 27 | H | H | " | " | —$CH_2$—$CH(CH_3)_2$ | " | H |
| 28 | H | H | " | " | —$CH_2$—$CH_2$—C$_6$H$_5$ | " | H |
| 29 | H | H | " | " | —C$_6$H$_5$ | " | H |
| 30 | H | H | " | " | —$NH_2$ | " | H |
| 31 | H | H | " | " | —NH—$CH(CH_3)_2$ | " | H |

TABLE I-continued

| Ex. No. | R | $R_1$ | $R_2$ | $R_3$ | $R_4$ | $R_5$ | $R_6$ |
|---|---|---|---|---|---|---|---|
| 32 | H | H | " | " | 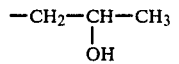 -N(CH₃)-C₆H₅ | " | H |
| 33 | H | H | " | " | —NH—CH₃ | " | H |
| 34 | H | H | " | " | —OH | " | H |
| 35 | H | H | " | " | —NH₂ | " | Cl |

EXAMPLES 36–65

Table II gives the structures of further dyestuffs of formula I, which may be prepared by the methods given in Examples 1–3. These correspond to the formula

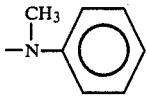

in which $R_4$, $R_5$ and $R_6$ are as shown in the corresponding columns. The anion $A^{\ominus}$ may be any anion described above.

TABLE II

| Ex. No. | $R_4$ | $R_5$ | $R_6$ |
|---|---|---|---|
| 36 | H | —CN | H |
| 37 | —CH₃ | " | " |
| 38 | H | —COOCH₃ | " |
| 39 | —CH₃ | " | " |
| 40 | H | —COOC₂H₅ | " |
| 41 | " | —COOC₄H₉ | " |
| 42 | —C₂H₅ | Cl | Cl |
| 43 | n-C₃H₇ | " | " |
| 44 | n-C₄H₉ | " | " |
| 45 | —C₃H₆OCH₃ | " | " |
| 46 | —C₂H₄—OH | " | " |
| 47 | —C₂H₄CN | " | " |
| 48 | —CH₂—C₆H₅ | " | " |
| 49 | —C₈H₁₇ | " | " |
| 50 | —C₆H₁₁ (cyclohexyl) | " | " |
| 51 | —CH(CH₃)₂ | " | " |
| 52 | —CH₂—CH₂—C₆H₅ | " | " |
| 53 | —C₂H₄—O—C₆H₅ | " | " |
| 54 | " | " | H |
| 55 | —CH₂—CH(OH)—CH₃ | " | " |
| 56 | —C₂H₄—O—C₂H₄OH | " | " |
| 57 | —C₃H₆—OH | " | " |
| 58 | —C(CH₃)₂—CH₂—CH(OH)—CH₃ | " | " |
| 59 | —CH₂—CH(C₂H₅)(CH₂)₃—CH₃ | " | " |
| 60 | " | " | Cl |
| 61 | —C(CH₃)₂—CH₂—CH(OH)—CH₃ | " | " |
| 62 | —C₃H₆—OH | " | " |
| 63 | —C₂H₄—O—C₂H₄OH | " | " |
| 64 | —CH₂—CH(OH)—CH₃ | " | " |
| 65 | —C₆H₅ (phenyl) | " | " |

EXAMPLES 66–69

Table III gives the structure of further dyestuffs of formula I, which may be prepared by the methods given in Examples 1–3. These correspond to the formula

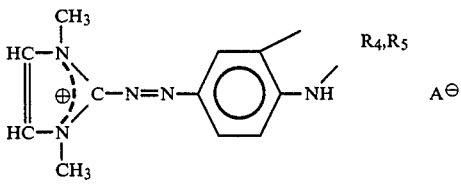

in which $R_4$ and $R_5$ together form the bridging group shown in the second column, the left-hand side of the bridging group being connected to the benzene ring and the right-hand side to the nitrogen atom. The anion $A^{\ominus}$ may be any anion described above.

| Ex. No. | $R_4$, $R_5$ |
|---|---|
| 66 | —O—CH₂—CH₂— |

-continued

| Ex. No. | R₄, R₅ |
|---|---|
| 67 | —O—CH₂—CH(CH₃)— |
| 68 | —(CH₂)₂— |
| 69 | —(CH₂)₃— |

The dyestuffs of Examples 4, 9, 11 to 14, 17, 20, 21 to 24, 26 to 35, 42 to 44, 49 to 62 and 65 to 69 dye polyacrylonitrile fibres in orange shades; those of Examples 5 to 8, 10, 15 and 16 in red-orange shades; those of Examples 18, 37, 39 to 41, 47 and 48 in yellow-orange shades; those of Examples 19, 45, 46, 63 and 64 in scarlet shades; those of Examples 25, 36 and 38 in golden-yellow shades.

APPLICATION EXAMPLE A

Polyacrylonitrile fibres are immersed at 60° at a liquor ratio of 1:80 in an aqueous bath containing 0.125 g/l glacial acetic acid, 0.375 g/l sodium acetate and 0.15 g/l of the dyestuff of Example 1 (or the corresponding quantity of a solid or liquid composition of this dyestuff). The bath is raised to boiling point over 20-30 minutes and kept at the boiling point for 60 minutes. After rinsing an orange dyeing is obtained.

APPLICATION EXAMPLE B

Acid modified polyester fibres are immersed at 20° at a liquor ratio of 1:40 in an aqueous bath containing 3 g/l sodium sulphate, 2 g/l ammonium sulphate and 2.5 g/l of a carrier, and the bath is brought to a pH of 5.5 by addition of formic acid. The bath is raised to 60° and 0.15 g/l of the dyestuff of Example 1 (or the corresponding quantity of a solid or liquid composition thereof) is added. The bath is then raised to boiling point over 30 minutes and held there for 60 minutes. After rinsing an orange dyeing is obtained.

APPLICATION EXAMPLE C

Acid modified polyester fibres are immersed at 20° at a liquor ratio of 1:30 in an aqueous bath containing 6 g/l sodium sulphate, 2 g/l ammonium sulphate and 0.15 g/l of the dyestuff of Example 1 or the corresponding quantity of a solid or liquid composition thereof.

The pH is adjusted with formic acid to 5.5 and the bath is heated in a closed vessel over 45 minutes to 120° and kept at this temperature for 60 minutes, with shaking. After rinsing and drying an orange dyeing is obtained.

APPLICATION EXAMPLE D

The procedure of Application Example C is followed, except that the closed vessel is heated only to 110°.

APPLICATION EXAMPLE E

Acid modified polyamide fibres are immersed at 20° at a liquor ratio of 1:80 in an aqueous bath containing 3.6 g/l sodium hydrogen sulphate, 0.7 g/l sodium sulphate, 1 g/l of a dyeing aid, e.g. a reaction product of a phenol with an excess of ethylene oxide and 0.15 g/l of the dyestuff of Example 1 or the corresponding quantity of a solid or liquid composition thereof. The bath is raised to boiling point over 30 minutes and held there for 60 minutes. After rinsing and drying an orange dyeing is obtained.

Application Examples A-E may be carried out using the dyestuffs of Examples 2-69.

EXAMPLE 70

60 Parts of the dyestuff of the formula

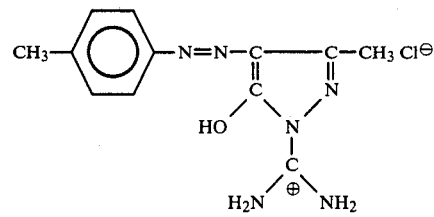

and 9.7 parts of the dyestuff of Example 1 are milled for 20 hours in a powder mill with 30.3 parts of dextrin. Alternatively, the same mixture may be obtained by dissolving or suspending both dye components in 400 parts of water and spray drying.

A cheese of 500 parts 75-denier "Orlon" is placed in an in-cheese dyeing apparatus with an aqueous dyebath at a liquor ratio of 1:20, the bath containing 0.7 parts of the above dye mixture in a solution of 1% sodium acetate, 10% sodium sulphate and 4% of 40% acetic acid at a pH of 4-4.5 and temperature of 80°. The apparatus is closed and the mixture raised to 105°-108° over 30 minutes and held in this temperature range for 30 minutes. Finally the bath is cooled and the cheese is centrifuged and dried. Before drying, the cheese may be treated at 70° with 10 parts water containing 5 parts concentrated formic acid and 10 parts of non-ionic dispersing agent. A level golden-yellow dyeing is obtained.

Further Examples of Mixtures

Representative dyestuffs of formula XIII are listed in table III below. The anion A⊖ of formula XIII may be any anion described above.

TABLE III

| Designation | R₃₄ | R₃₀ | R₃₁ | R₃₂ | R₃₃ | Shade on dyeing on Polyacrylonitrile |
|---|---|---|---|---|---|---|
| A | H | H | H | H | —CH₃ | green-yellow |
| B | H | m-CH₃ | H | H | —CH₃ | yellow |
| C | H | o-CH₃ | H | H | —CH₃ | yellow |
| D | H | p-F | H | H | —CH₃ | green-yellow |
| E | H | m-F | H | H | —CH₃ | green-yellow |
| F | H | p-Cl | H | H | —CH₃ | green-yellow |
| G | H | m-Cl | H | H | —CH₃ | green-yellow |
| H | H | o-OCH₃ | H | H | —CH₃ | red-yellow |
| I | H | m-OCH₃ | H | H | —CH₃ | yellow |
| J | H | p-OCH₃ | H | H | —CH₃ | red-yellow |

TABLE III-continued

| Designation | $R_{34}$ | $R_{30}$ | $R_{31}$ | $R_{32}$ | $R_{33}$ | Shade on dyeing on Polyacrylonitrile |
|---|---|---|---|---|---|---|
| K | H | p-OCH$_3$ | m-OCH$_3$ | H | —CH$_3$ | red-yellow |
| L | H | p-OC$_2$H$_5$ | H | H | —CH$_3$ | red-yellow |
| M | H | o-C$_2$H$_5$ | H | H | —CH$_3$ | yellow |
| N | H | p-C$_2$H$_5$ | H | H | —CH$_3$ | yellow |
| O | H | p-CH$_3$ | m-CH$_3$ | H | —CH$_3$ | red-yellow |
| P | H | p-CH$_3$ | o-CH$_3$ | H | —CH$_3$ | red-yellow |
| Q | H | m-CH$_3$ | o-CH$_3$ | H | —CH$_3$ | red-yellow |
| R | H | p-CH$_3$ | o-CH$_3$ | o-CH$_3$ | —CH$_3$ | red-yellow |
| S | H | H | H | H | —C$_2$H$_5$ | green-yellow |
| T | H | H | H | H | —C$_6$H$_5$ | green-yellow |
| U | —CH$_3$ | H | H | H | —CH$_3$ | green-yellow |
| V | H | H | H | H | H | green-yellow |
| W | H | p-CH$_3$ | H | H | H | green-yellow |
| X | H | p-CH$_3$ | m-CH$_3$ | H | H | green-yellow |

The dyestuff of formula XIII described in Example 70, or any of those listed as A–X in Table III, may be mixed with any one of the compounds of Examples 1, 4, 5, 6, 9, 66, 67, 68 and 69. Such mixtures may be prepared and used as described in Example 70 and give neutral yellow to yellowish-red dyeings.

What is claimed is:

1. A compound of the formula

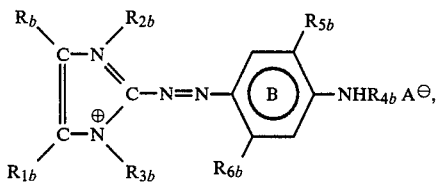

wherein
each of $R_b$ and $R_{1b}$ is independently hydrogen or methyl,
each of $R_{2b}$ and $R_{3b}$ is independently methyl, ethyl, 2-hydroxyethyl or 2-hydroxy-n-propyl,
$R_{4b}$ is hydrogen, methyl, ethyl, propyl, n-butyl, 2-ethyl-n-hexyl, 2-hydroxyethyl, 3-hydroxypropyl, 2-hydroxy-n-propyl, 3-methoxy-propyl, 2-cyanoethyl, benzyl, 2-phenylethyl or 2-phenoxyethyl,
$R_{5b}$ is chloro or fluoro,
$R_{6b}$ is hydrogen, chloro or methyl or
$R_{4b}$, $R_{5b}$ and $R_{6b}$ taken together and with the nitrogen atom to which $R_{4b}$ is attached and with Ring B are

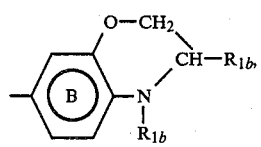

wherein each $R_{1b}$ is hydrogen or methyl, and $A^{\ominus}$ is an anion.

2. A compound according to claim 1 wherein $R_{4b}$, $R_{5b}$ and $R_{6b}$ taken together and with the nitrogen atom to which $R_{4b}$ is attached and with Ring B are

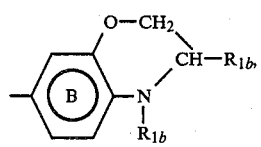

3. A compound according to claim 1 wherein
$R_{4b}$ is hydrogen, methyl, ethyl, propyl, n-butyl, 2-ethyl-n-hexyl, 2-hydroxyethyl, 3-hydroxypropyl, 2-hydroxy-n-propyl, 3-methoxypropyl, 2-cyanoethyl, benzyl, 2-phenylethyl or 2-phenoxyethyl, and
$R_{5b}$ is chloro or fluoro.

4. A compound according to claim 3 wherein $R_{6b}$ is hydrogen or chloro.

5. A compound according to claim 4 wherein
$R_b$ is hydrogen,
$R_{1b}$ is hydrogen,
$R_{2b}$ is methyl,
$R_{3b}$ is methyl, and
$R_{4b}$ is hydrogen, methyl, ethyl, propyl, n-butyl, 2-ethyl-n-hexyl, 2-hydroxyethyl, 3-hydroxypropyl, 2-hydroxy-n-propyl or 3-methoxypropyl.

6. A compound according to claim 5 having the formula

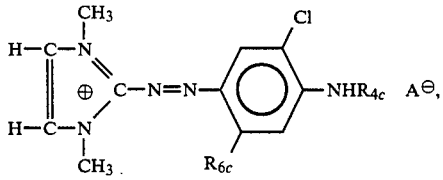

wherein
$R_{4c}$ is hydrogen, methyl, ethyl, propyl, n-butyl, 2-ethyl-n-hexyl, 2-hydroxyethyl, 3-hydroxypropyl, 2-hydroxy-n-propyl or 3-methoxypropyl,
$R_{6c}$ is hydrogen or chloro, and
$A^{\ominus}$ is an anion.

7. A compound according to claim 6 having the formula

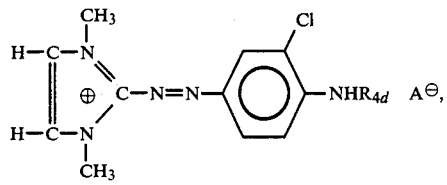

wherein
R$_{4d}$ is hydrogen, methyl, ethyl or 2-hydroxyethyl, and
A$^\ominus$ is an anion.

8. A compound according to claim 7 having the formula

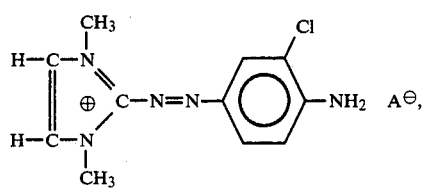

wherein A$^\ominus$ is an anion.

9. A compound according to claim 8 wherein A$^\ominus$ is ½ZnCl$_4$$^\ominus$ or CH$_3$SO$_4$$^\ominus$.

10. A compound according to claim 7 having the formula

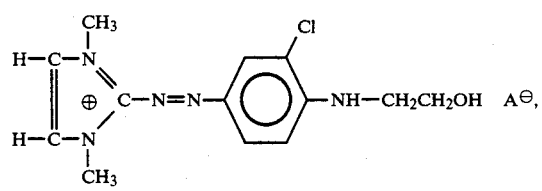

wherein A$^\ominus$ is an anion.

11. A compound according to claim 7 having the formula

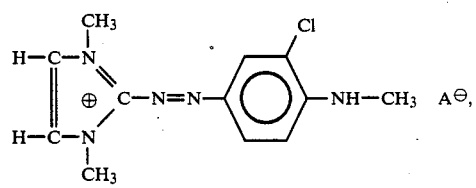

wherein A$^\ominus$ is an anion.

12. The compound according to claim 6 having the formula

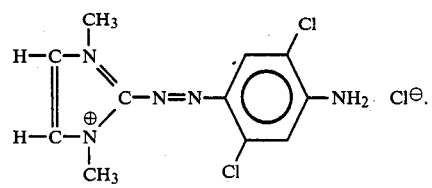

13. A compound according to claim 5 having the formula

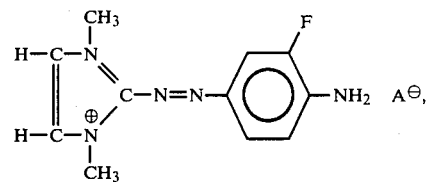

wherein A$^\ominus$ is an anion.

14. A compound according to claim 5 having the formula

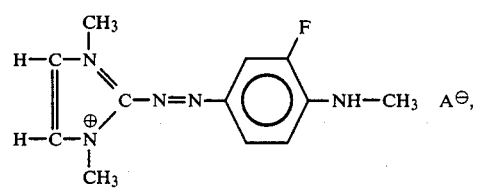

wherein A$^\ominus$ is an anion.

15. A compound according to claim 7 having the formula

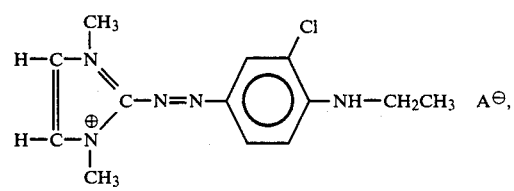

wherein A$^\ominus$ is an anion.

16. A compound according to claim 4 wherein
R$_b$ is hydrogen,
R$_{1b}$ is hydrogen,
R$_{2b}$ is methyl or ethyl,
R$_{3b}$ is methyl or ethyl, and
R$_{4b}$ is methyl or ethyl.

17. A compound of the formula

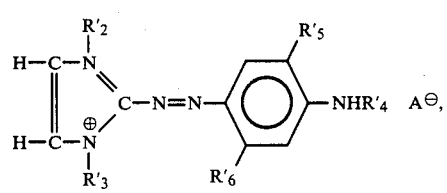

wherein
each of R'$_2$ and R'$_3$ is independently C$_{1-4}$alkyl, C$_{2-4}$alkyl monosubstituted by hydroxy or allyl,
R'$_4$ is C$_{1-4}$alkyl or C$_{2-4}$alkyl monosubstituted by hydroxy, cyano, halo or C$_{1-4}$alkoxy,
R'$_5$ is halo, C$_{1-4}$alkyl or C$_{1-4}$alkoxy,
R'$_6$ is hydrogen or halo, and
A$^\ominus$ is an anion.

18. A compound according to claim 17 wherein each of R'$_2$ is methyl or ethyl,
R'$_4$ is methyl or ethyl,
R'$_5$ is fluoro, chloro, methoxy or ethoxy, and
R'$_6$ is hydrogen or chloro.

19. A compound according to claim 18 wherein R'$_5$ is methoxy or ethoxy, and
R'$_6$ is hydrogen.

* * * * *